United States Patent Office 3,558,669
Patented Jan. 26, 1971

---

3,558,669
ORGANIC COMPOUNDS CONTAINING 2 TO 4 AZIDOFORMATE GROUPS
David S. Breslow, Munich, Germany, assignor to Hercules Incorporated, Wilmington, Del., a corporation of Delaware
No Drawing. Continuation-in-part of applications Ser. No. 172,815, Feb. 12, 1962, now Patent No. 3,211,752, and Ser. No. 247,878, Dec. 28, 1962. This application Dec. 14, 1964, Ser. No. 418,278
Int. Cl. C07c *117/02*
U.S. Cl. 260—349                      4 Claims

ABSTRACT OF THE DISCLOSURE

An azidoformate having the formula

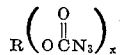

where $x$ is a whole number of 2 to 4 and R is selected from the group consisting of alkylene, cycloalkylene, arylene, arylenedialkylene, alkylene, diarylene, cycloalkylene, dialkylene, oxydialkylene, thiodialkylene, alkylene poly (oxyalkylene), alkylene bis(polyoxyalkylene), and carbyl tetrakis (alkylene oxyalkylene), said R radicals containing at least one carbon atom per azidoformate group. The compounds are useful for cross-linking polymers.

---

This application is a continuation-in-part of my application U.S. Ser. No. 172,815, filed Feb. 12, 1962, now Pat. No. 3,211,752, and of my application U.S. Ser. No. 247,878, filed Dec. 28, 1962, now abandoned.

This invention relates to poly(azidoformate)s, which compounds are new agents useful for cross-linking polymers.

In the past, industry has depended almost entirely upon sulfur or sulfur-bearing materials as vulcanizing, i.e., cross-linking agents. It has more recently been discovered that certain types of organic peroxides or azo compounds are capable of acting as vulcanizing agents. However, all of the above agents suffer the drawback that because of their mode of action they are not equally effective in cross-linking all types of polymers. For example, polybutadiene is effectively vulcanized by peroxides while butyl rubber and crystalline polypropylene are not.

Now in accordance with this invention, it has unexpectedly been found that a number of polymers can be cross-linked by non-volatile azidoformate compounds to produce vulcanizates that are tough, resilient, solvent resistant, and odor free. In addition, it has been found that the polymers can be treated with smaller amounts of the azidoformates to improve their properties without materially affecting their solubility.

The new azidoformates of this invention are solids or oils having the general formula

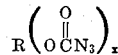

where $x$ is at least 2, preferably from 2 to 4, and R is an organic radical, inert to cross-linking reactions, containing at least one carbon atom per azidoformate group. Exemplary of the new azidoformates of this invention are those compounds wherein R is alkylene, as for example in ethylene bis(azidoformate), trimethylene bis(azidoformate), tetramethylene bis(azidoformate), pentamethylene bis(azidoformate), hexamethylene bis(azidoformate), 1,9-nonane-bis(azidoformate), 1,10-decane-bis (azidoformate), etc.; cycloalkylene, as for example in cyclohexylene-1,2-bis(azidoformate), cyclohexylene - 1,3-bis(azidoformate), and cyclohexylene - 1,4 - bis(azidoformate); arylene, as for example in o-, m-, and p-phenylene bis(azidoformate); arylene-dialkylene, as for example in o-, m-, and p-xylylene bis(azidoformate); alkylene-diarylene, as for example in 2,2-isopropylidene-bis(p,p′-phenylazidoformate); cycloalkylene-dialkylene, as for example in 1,4-cyclohexane-dimethyl bis(azidoformate); oxydialkylene, as for example in 2,2′-oxydiethyl bis(azidoformate, 2,2′-oxydipropyl bis(azidoformate); thiodialkylene, as for example in 2,2′-thiodiethyl bis(azidoformate), 4,4′-thiodibutyl bis(azidoformate); alkylene poly(oxyalkylene), as for example in 2,2′-ethylenedioxyethyl bis (azidoformate), i.e., ethylene bis(oxyethylene azidoformate), the tris(azidoformate) of glycerol—propylene oxide adduct; alkylene-bis(polyoxyalkylene), as for example the bis(azidoformate)s of poly(ethylene glycol) and poly (propylene glycol), and carbyl tetrakis(alkyleneoxyalkylene), as for example in the tetraazidoformate of pentaerythritol—propylene oxide adduct having the formula

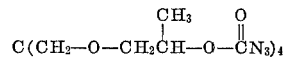

Most of these azidoformates are relatively insensitive to impact and are sweet-smelling, colorless, solids or oils. Especially preferred for use in modifying and cross-linking polymers are those azidoformates having a boiling point of at least about 100° C. at a pressure of 70 mm. of mercury.

The azidoformates of this invention can be prepared in various ways, as for example, by reacting a chloroformate with an excess, i.e., from about 1.05 moles to about 10 moles per equivalent of chloroformate, of an alkali azide. This reaction can be shown by the following equation

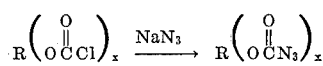

where R and $x$ are as defined above. The chloroformates are well known materials whose preparation is described in the chemical literature. Before describing the invention in greater detail, the following examples are presented to illustrate the preparation of the new azidoformates, all parts and percentages being by weight unless otherwise indicated.

EXAMPLE 1

To a solution of 65 parts of sodium azide in 150 parts of water was added dropwise with vigorous agitation 54 parts of tetramethylene-bis(chloroformate) dissolved in 370 parts of chloroform. The reaction mixture was agitated vigorously and maintained at room temperature for approximately three days. Then the chloroform layer was separated and washed several times with water to remove any water-soluble impurities. The chloroform solution was dried over magnesium sulfate and sodium sulfate. The azidoformate product was isolated by removing the chloroform under vacuum. Tetramethylene-bis(azidoformate) was obtained as an oil which solidified while standing at room temperature and had a melting point of 30.0–31.2° C. The yield was 96.3% of theoretical, and the product was calculated to be 100% pure, based on the liberation of nitrogen upon decomposition of the azidoformate in diphenyl ether at a temperature of 133° C. Analysis for percent carbon, hydrogen, oxygen and nitrogen gave the following figures:

Calculated for $C_6H_8N_6O_4$ (percent): C, 31.58; H, 3.53; O, 28.05; N, 36.84. Found (percent): C, 31.57; H, 3.27; O, 28.19; N, 37.05.

EXAMPLE 2

To a solution of 13 parts of sodium azide in 30 parts of water was added dropwise with vigorous agitation 10 parts of 2,2'-oxydiethyl-bis(chloroformate) dissolved in approximately 60 parts of chloroform. The reaction mixture was agitated vigorously and maintained at room temperature for 20 hours. Then the azidoformate was isolated as described in Example 1. The 2,2'-oxydiethyl-bis(azidoformate) was obtained in a yield of 92.5% of theoretical. It was a white crystalline solid having a melting point of 47.6–48.4° C. Analysis for percent carbon, hydrogen and nitrogen gave the following figures:

Calculated for $C_6H_8N_6O_5$ (percent): C, 29.5; H, 3.3; N, 34.4. Found (percent): C, 29.7; H, 3.1; N, 33.0.

EXAMPLE 3

To a solution of 13 parts of sodium azide in 30 parts of water was added dropwise with vigorous agitation 13.2 parts of $\alpha,\alpha'$-p-xylylene-bis(chloroformate) in 149 parts of chloroform. The reaction mixture was agitated vigorously and maintained at room temperature for approximately four days. Then the azidoformate product was isolated as described in Example 1. The $\alpha,\alpha'$-p-xylylene-bis(azidoformate) was obtained as a white solid which after recrystallization from alcohol had a melting point of 69–71° C. The yield was 96% of theoretical. The product was calculated to be 99% pure, based on the liberation of nitrogen upon its decomposition in diphenyl ether at a temperature of 133° C.

EXAMPLE 4

To a solution of 12.5 parts of sodium azide in 30 parts of water was added dropwise with vigorous agitation 17 parts of 2,2-isopropylidene-bis(p,p'-phenyl chloroformate) in 149 parts of chloroform. The reaction mixture was agitated vigorously and maintained at room temperature for approximately four days. Then the azidoformate product was isolated as described in Example 1. The 2,2'-isopropylidene-bis(p,p'-phenyl azidoformate) was obtained as a white solid which after recrystallization from alcohol had a melting point of 69.0–70.5° C. The yield was 92% of theoretical. The product was calculated to be 100% pure, based on the liberation of nitrogen upon its decomposition in diphenyl ether at a temperature of 133° C.

EXAMPLE 5

Pentamethylene bis(azidoformate) was prepared following the general procedure of Example 1 by reacting 58.5 parts of sodium azide in 150 parts of water with 68.7 parts of 1,5-pentane bis(chloroformate) in 475 parts of chloroform at room temperature for 26 hours. The pentamethylene bis(azidoformate) was obtained in a 93.5% yield and infrared analysis showed the typical strong carbonyl and $N_3$ bonds of the azidoformate group. It was a sweet-smelling oil having a refractive index of $n_D^{22°}$ 1.4665 and nitrogen liberation showed it to be 86.5% pure.

EXAMPLE 6

Ethylene bis(azidoformate) was prepared following the general procedure of Example 1 by reacting 10 parts of ethylene bis(chloroformate) in 300 parts of ethylene dichloride with 50 parts of sodium azide dissolved in 120 parts of water at room temperature for about 36 hours. Infrared analysis of the product showed it to have the typical doublet azide peak at 2135 and 2180 cm.$^{-1}$ and the carbonyl peak at 1735 cm.$^{-1}$ which were in agreement for this structure.

EXAMPLE 7

Example 6 was repeated except that trimethylene bis(chloroformate) was substituted for the ethylene bis(chloroformate) used in that example. The trimethylene bis(azidoformate) so prepared was analyzed by infrared and found to have the characteristic azide doublet at 2135 and 2180 cm.$^{-1}$ with the carbonyl peak at 1735 cm.$^{-1}$.

EXAMPLE 8

Example 2 was repeated except that 13 parts of 2,2'-oxydipropyl bis(chloroformate) was substituted for the 10 parts of 2,2'-oxydiethyl bis(chloroformate) used in that example. The 2,2'-oxydipropyl bis(azidoformate) was obtained in a yield of about 90%. It was a colorless oil having a refractive index of $n_D^{22°}$ 1.4616. By nitrogen evolution, it was shown to be 99.4% pure.

EXAMPLE 9

Example 2 was repeated except that 12.4 parts of 2,2'-thiodiethyl bis(chloroformate) was substituted for the 10 parts of 2,2'-oxydiethyl bis(chloroformate) used in that example. The 2,2'-thiodiethyl bis(azidoformate) so obtained was a colorless oil having a refractive index of $n_D^{22°}$ 1.5163. It was obtained in a yield of 77%.

EXAMPLE 10

A solution of 5.9 parts of m-phenylene bis(chloroformate) prepared by the reaction of resorcinol with phosgene and having a melting point of 45.2–46° C., in 125 parts of ethylene dichloride was added at room temperature to 13 parts of sodium azide in 26 parts of water. After stirring at room temperature for several days, the organic layer was separated, washed with water and dried. The infrared absorption of this solution had the characteristic absorption for the azide at 2160 and 2190 cm.$^{-1}$ and the strong carbonyl bond at 1750 cm.$^{-1}$. The m-phenylene bis(azidoformate) was analyzed by nitrogen evolution and found to yield 96.3% of the theoretical amount.

EXAMPLE 11

Example 2 was repeated except that 10.9 parts of 2,2'-ethylenedioxydiethyl bis(chloroformate) was substituted for the 10 parts of 2,2'-oxydiethyl bis(chloroformate) used in that example. The 2,2'-ethylenedioxydiethyl bis(azidoformate) so obtained was a clear oil which had a refractive index of $n_D^{22°}$ 1.4715. It was obtained in a yield of 87%. On analysis, it was found to contain 33.6% carbon, 4.1% hydrogen, 28.2% nitrogen and 32.8% oxygen. Calculated values for $C_8H_{12}N_6O_6$ are 33.33% carbon, 4.20% hydrogen, 29.16% nitrogen and 33.31% oxygen.

EXAMPLE 12

The chloroformate of 1,4-cyclohexanedimethanol was prepared by adding the diol (144 parts) to excess phosgene at 0° C. (230 parts). The product was a semi-solid and was obtained in a 95% yield.

To a solution of 13 parts of sodium azide in about 30 parts of water was added at room temperature 13.5 parts of the 1,4-cyclohexanedimethyl bis(chloroformate) dissolved in about 60 parts of chloroform. After stirring at room temperature, the product was isolated as in Example 1. The 1,4-cyclohexanedimethyl bis(azidoformate) was obtained in a 95% yield and by nitrogen evolution was shown to be 97% pure. It was a colorless solid which on recrystallization from methylene chloride-pentane had a melting point of 91–93° C. On analysis, it was found to contain 42.9% C, 5.4% H, 28.4% N and 21.1% O (theoretical values are 42.55% C, 5.00% H, 29.78% N and 22.67% O).

EXAMPLE 13

The tetrakis(chloroformate) of pentaerythritol-propylene oxide was prepared by adding the tetrol to phosgene at 0° C. A solution of 13 parts of this product in 150 parts of chloroform was added at room temperature to a solution of 10.4 parts of sodium azide in 25 parts of water. The reaction mixture was stirred at room temperature for 4 days, after which the organic layer was separated, washed with water and dried. Infrared analysis showed that no hydroxyl remained and that the product had the typical azide doublet at 2135 and 2180 cm.$^{-1}$ with a strong carbonyl at 1750 cm.$^{-1}$. The carbyl tetrakis(methyleneoxyisopropylene azidoformate) was a viscous colorless oil, obtained in a 93% yield, and 99% pure as determined by nitrogen evolution.

EXAMPLES 14–16

In these examples, bis(azidoformate)s of polyethylene glycols and polypropylene glycol were prepared.

The bis(chloroformate) is of a commercial poly(ethylene glycol) having a DP of 6.7 (11.3% hydroxyl) of a commercial poly(ethylene glycol) having a DP of 9.3 (8.3% hydroxyl), and of a poly(propylene glycol) having a DP of 7.3 (8.4% hydroxyl) were prepared by adding the diols to an excess of phosgene at 0° C. All three products were oils with refractive indices of $n_D^{22°}$ 1.4641, 1.4668 and 1.4488, respectively.

The bis(azidoformate)s were prepared by the process used in Example 2, using 22 parts of the bis(chloroformate) of poly(ethylene glycol) of DP 6.7; 28.4 parts of the bis(chloroformate) of poly(ethylene glycol) of DP 9.3; and 28.4 parts of the bis(chloroformate) of poly(propylene glycol) of DP 7.3. The azidoformates were oils in each case having refractive indices of $n_D^{22°}$ 1.4732, 1.4740 and 1.4574, respectively. They were obtained in yields of 90, 92 and 98% and were 91, 90 and 100% pure, respectively, based on nitrogen evolution analysis.

Any type of hydrocarbon polymer, including saturated, unsaturated, linear atactic, crystalline, or nonlinear amorphous polymers, as for example, polyethylene, polypropylene, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc., and blends of these polymers with each other or nonhydrocarbon polymers can be cross-linked with any of the new azidoformates provided it has a boiling point of at least about 100° C. at a pressure of 70 mm. of mercury. In addition to the hydrocarbon polymers, a large number of nonhydrocarbon polymers can also be cross-linked with the new azidoformates. Typical of the nonhydrocarbon polymers that can be cross-linked in accordance with this invention are the cellulose esters such as cellulose acetate butyrate, the cellulose partial alkyl ethers such as hydroxyethyl and hydroxypropyl cellulose, chlorinated natural rubber, sulfochlorinated polyethylene, poly(vinyl acetate), poly(vinyl chloride), poly(vinylidene chloride), poly(ethyl acrylate), poly(ethylene oxide), poly[3,3-bis(chloromethyl) oxetane], vinyl modified polydimethyl siloxane, polychloroprene, butadiene-acrylonitrile copolymer, etc., and blends of these polymers with each other or hydrocarbon polymers.

The cross-linking process can be carried out by heating the polymer plus the azidoformate compound above its decomposition temperature. This temperature varies over a wide range, but in general, will be in the range of from about 70° C. to about 350° C. Various amounts of cross-linking agent can be added, the optimum amount depending on the amount of cross-linking desired, the specific azidoformate compound employed, etc. For example, in some cases, such as in certain film applications, it may be desirable to merely add a sufficient amount of azidoformate compound to strengthen the polymer without materially affecting its solubility. In general, the amount added, based on the weight of the polymer, will be from about 0.01% to about 20%. In some cases, it may be desirable to add a small amount, i.e., from about 0.01% to about 1.0%, of sulfur, which seems to act as a co-agent for the azidoformates.

The cross-linking agent can be incorporated in the polymer in any desired fashion; for example, it can be uniformly blended by simply milling on a conventional rubber mill or dissolved in a solution containing the polymer. By either means, the azidoformate compound is distributed throughout the polymer and uniform cross-linking is effected when the blend is subjected to heat. Other means of mixing the cross-linking agent with the polymer will be apparent to those skilled in the art.

In addition to the cross-linking agent, other ingredients can also be incorporated. The additives commonly used in rubber vulcanizates can be used here also, as for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filter, and in particular carbon black, is beneficial and, as in rubber compounding, gives optimum results. Obviously, there are many cases in which a filler is not required or desired, and excellent results are achieved when only the cross-linking agent is added.

The following examples are presented to illustrate the use of the new azidoformates for cross-linking polymers with parts and percentages being by weight unless otherwise specified. In some of the examples, the extent of cross-linking is determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the cross-link density. Percent gel and swell are determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weighs of initial and final sample are corrected for polymer and copolymer content based on knowledge of components. From these figures $$\frac{\text{corrected dry weight}}{\text{corrected initial weight}} \times 100 = \text{percent gel}$$

$$\frac{\text{corrected swollen weight} - \text{corrected dry weight}}{\text{corrected dry weight}} \times 100 = \text{percent swell}$$

The molecular weight of some of the polymers cross-linked in the examples can be indicated by their Reduced Specific Viscosity (RSV). By the term "Reduced Specific Viscosity" is meant the $\eta_{sp}/C$ determined on a 0.1% solution (0.1 g. of the polymer per 100 ml. of solution) of the polymer at elevated temperature.

EXAMPLES 17–25

Ten samples of elastomeric ethylene-propylene copolymers were cross-linked with different azidoformates as follows: In each example the copolymer and azidoformate were codissolved in carbon tetrachloride and then the solvent was allowed to evaporate overnight at room temperature. Each mixture was cured by heating in a closed iron mold for one hour at a temperature of 160° C. The resulting vulcanizates were odorless and had not discolored. The specific azidoformate used, the amount of each azidoformate used, the mole percent of propylene and RSV of the ethylene-propylene copolymer and the percent gel of the resulting vulcanizate, as determined in toluene at 80° C. are tabulated in Table I.

TABLE I

| Example: | Mole percent propylene | RSV* | Azidoformate | Parts/100 parts of copolymer | Percent gel |
|---|---|---|---|---|---|
| 17 | 29 | 4.0 | Tetramethylene-bis (azidoformate) | 7 | 85 |
| 18 | 29 | 4.0 | 2,2'-oxydiethyl-bis (azidoformate) | 5 | 87 |
| 19 | 29 | 4.0 | 2,2'-ethylenedioxydiethyl-bis (azidoformate) | 5 | 81 |
| 20 | 31 | 1.9 | 2,2'-oxydipropyl-bis (azidoformate) | 5 | 83 |
| 21 | 31 | 1.9 | 2,2'-thiodiethyl-bis (azidoformate) | 6 | 76 |
| 22 | 31 | 1.9 | Pentamethylene-bis (azidoformate) | 10 | 88 |
| 23 | 31 | 1.9 | α,α'-p-xylylene-bis (azidoformate) | 5 | 90 |
| 24 | 31 | 1.9 | 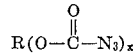 | 5 | 66 |
| 25 | 31 | 1.9 | 2,2-isopropylidene-bis (p,p'-phenylazidoformate) | 5 | 89 |

*As determined in decahydronaphthalene at a temperature of 135° C.

EXAMPLE 26

A sample of an ethylene-propylene copolymer, containing 30 mole percent propylene and having an RSV of 2.1 as determined in decahydronaphthalene at a temperature of 135° C., was cross-linked with 1,4-cyclohexanedimethyl-bis(azidoformate). The following ingredients were compounded on a two-roll mill at a temperature of 38° C. for 30 minutes.

Ingredients: Parts
- Ethylene-propylene copolymer _____ 100
- High abrasion furnace black _____ 50
- 1,4-cyclohexanedimethyl-bis(azidoformate) __ 2
- Polymerized trimethyl dihydroquinoline (antioxidant) _____ 0.5
- Sulfur _____ 0.175

The resulting mixture was cured in a closed iron mold at a temperature of 150° C. for 30 minutes. The properties of the vulcanizate were as follows:

- Tensile strength, p.s.i. _____ 2250
- Modulus at 300% elongation, p.s.i. _____ 1460
- Elongation percent _____ 415
- Shore A hardness _____ 69
- Break set percent _____ 15

What I claim and desire to protect by Letters Patent is:

1. A compound of the formula:

$$R(O-\overset{O}{\underset{\|}{C}}-N_3)_x$$

wherein R is selected from the group consisting of phenylene, xylylene and 2,2-isopropylidene-bis(p,p'-phenylene) radicals, and $x$ is two.

2. m-Phenylene-bis(azidoformate).
3. α,α'-p-Xylylene-bis(azidoformate).
4. 2,2-isopropylidene-bis(p,p'-phenyl azidoformate).

References Cited

UNITED STATES PATENTS 3,211,752 10/1965 Breslow.
3,324,148 6/1967 Cotter.

ALEX MAZEL, Primary Examiner
J. H. TURNIPSEED, Assistant Examiner

U.S. Cl. X.R.

260—2, 37, 41, 41.5, 46.5, 79.3, 79.5, 80.7, 83.3, 85.1, 89.1, 89.5, 92.8, 93.5, 94.7, 94.9